Patented Dec. 10, 1935

2,023,926

UNITED STATES PATENT OFFICE 2,023,926

PROCESS OF PREPARING VAT DYESTUFFS OF THE PYRANTHRONE SERIES AND NEW VAT DYESTUFFS PREPARED THEREBY

Georg Kränzlein, Heinrich Vollmann, and Werner Schultheis, Frankfort-on-the-Main-Hoechst, Germany, assignors to General Aniline Works, Inc., New York, N. Y., a corporation of Delaware No Drawing. Application April 4, 1932, Serial No. 603,201. In Germany April 17, 1931

6 Claims. (Cl. 260—61)

The present invention relates to a process of preparing vat dyestuffs of the pyranthrone series and to new vat dyestuffs prepared thereby, more particularly it relates to new compounds of the general formula:

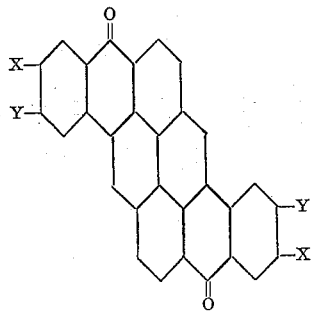

wherein the two X's or the two Y's are substituted by methyl.

We have found that vat dyestuffs of the pyranthrone series are obtainable by condensing pyrene with an aromatic carboxylic acid derivative of the formula:

aryl—CO.R wherein R represents halogen or the group —O—CO—aryl, the two aryls being identical, and wherein the aryl group contains at least one unsubstituted ortho-position to the ketonic group, in the presence of aluminium chloride while introducing a dehydrogenizing agent into the reaction mixture. The yield of the dyestuffs obtainable according to the said process on an average amounts to 50-60 per cent of that of the theory. Yields of such a high percentage were not to be expected in view of the facts hitherto known.

In carrying out the present process it is advantageous to add to the melt of aluminium chloride an admixture which facilitates the melting process, such as an alkali halide or an excess of the acid chloride or acid anhydride. As dehydrogenizing agents there may be used gaseous oxygen, air or solid oxidizing agents such as heavy metal oxides or certain non-metal oxides.

The following examples serve to illustrate the invention, but they are not intended to limit it thereto, the parts being by weight:

(1) A solution of 20 parts of pyrene in 28.2 parts of benzoylchloride is run at about 110° C.–about 120° C. into a melt of 270 parts of aluminiumchloride and 58 parts of sodium chloride, while stirring. The melt is rapidly heated to about 160° C. and oxygen is introduced at this temperature, while well stirring. The melt which is at first yellowish-red assumes a violet coloration and finally turns blue. After one hour the whole is decomposed with water and the orange-brown crude product is purified by re-vatting it or by treating it with hypochlorite. The yield of purified dyestuff amounts to about 20 parts=50 per cent of that of the theory. The dyestuff crystallizes from nitrobenzene in the form of reddish-yellow needles; it dissolves in sulfuric acid to a blue solution, dyes cotton from a violet-blue vat orange tints and behaves in every respect like pyranthrone.

(2) 80 parts of pyrene are dissolved in 168 parts of benzoylchloride at water-bath temperature. The solution is run at about 130° C.–about 150° C., while stirring, into a melt of 1350 parts of aluminium chloride and 250 parts of sodium chloride. The temperature is raised, while well stirring, to about 150 C.– about 170° C. and oxygen is introduced until the color of the melt has become blue. The whole is decomposed with water and further treated as described in Example 1. There are obtained 80 parts of purified dyestuff which is identical with that obtainable according to Example 1.

(3) A solution of 20 parts of pyrene in 350 parts of m-chloro-benzoylchloride is run at about 130° C. into 400 parts of aluminium potassium chloride in the proportion of 1 mol. of $Al_2Cl_6$ to 1 mol. of KCl. Thereupon pyrolusite is introduced, while stirring, in small portions until the color of the melt has become blue which is the case after 20–30 minutes. The melt is worked up and the crude dyestuff is purified as described in the preceding examples. The dyestuff thus obtained dissolves in concentrated sulfuric acid to a blue solution having a more greenish hue than that obtained with the dyestuff of Example 1 and dyes cotton from a violet-blue vat orange tints. It probably has the following constitution:

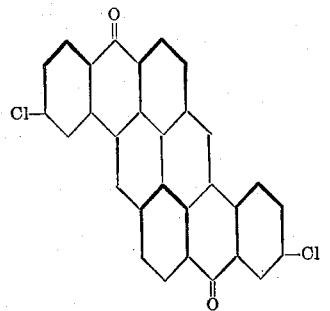

By using instead of meta-chlorobenzoylchloride para-chloro-benzoylchloride there is obtained a similar dyestuff.

(4) 20 parts of pyrene and 31 parts of para-toluyl-acid chloride are molten at about 150° C.–about 160° C. with 400 parts of sodium-aluminium chloride, while introducing air, until the color of the melt has become a pure blue. The dyestuff which is isolated and purified as described in the preceding examples, crystallizes from quinoline in the form of orange-yellow needles and yields from a bluish-red vat clear orange tints of good fastness properties. It probably has the following constitution:

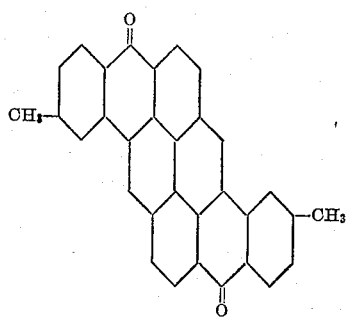

By using instead of para-toluyl-acid chloride meta-toluyl-acid chloride, a similar dyestuff is obtained.

(5) 20 parts of pyrene are introduced, while stirring, into a solution of 30 parts of benzoic acid anhydride in 400 parts of sodium aluminium chloride (NaCl—Al₂Cl₆) at about 120° C.–about 130° C. The reddish-violet melt is vigorously stirred, while introducing air, until its color has become clear blue. Thereupon, the melt is decomposed with water and the crude dyestuff which has been precipitated is purified by revatting it. The dyestuff thus obtained is identical with that obtainable according to Example 1.

(6) A solution of 20 parts of pyrene in 40 parts of α-naphthoylchloride of about 100° C. is introduced at about 110° C.–about 120° C., while stirring, into 500 parts of sodium aluminium chloride and subsequently treated with air or oxygen as indicated in the preceding examples, until the color of the melt has become blue. The dyestuff thus obtained rather difficultly forms a vat and yields on cotton brownish-orange tints.

(7) To a melt prepared from pyrene, benzoylchloride, aluminium chloride and sodium chloride as described in Example 1, there are gradually added at about 160° C.–about 180° C., while stirring, about 20 parts of voluminous iron oxide. The oxygen of iron oxide acts as a dehydrogenizing agent so that the melt rapidly assumes the blue color of the solution of pyranthrone. The product is worked up as described in Example 1.

We claim:

1. The process which comprises condensing pyrene with an aromatic carboxylic acid derivative of the formula:

aryl—CO—R wherein R represents halogen or the group —O.CO.aryl, the two aryls being of the benzene or naphthalene series and being identical, and wherein the aryl group contains at least one unsubstituted ortho-position to the ketonic group, in the presence of aluminium chloride while introducing a dehydrogenizing agent into the reaction mixture.

2. The process which comprises condensing pyrene with benzoylchloride in the presence of sodium aluminium chloride while introducing a dehydrogenizing agent into the reaction mixture.

3. The process which comprises adding a solution of pyrene in benzoylchloride to a melt of sodium aluminium chloride, while stirring, at a temperature of about 110° C.–about 120 C., heating the mixture up to about 160° C. and introducing oxygen at this temperature, while well stirring, until the color of the melt has changed to blue.

4. As new products, the compounds of the formula:

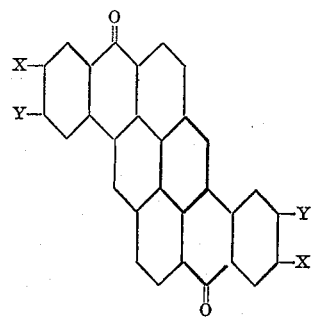

wherein the two X's or the two Y's are substituted by methyl.

5. As a new product, the compound of the formula:

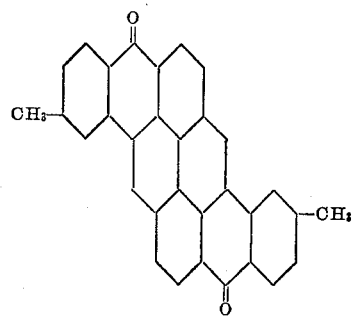

crystallizing from quinoline in the form of orange-yellow needles and yielding from a bluish-red vat clear orange tints of good fastness properties.

6. As a new product, the compound of the formula:

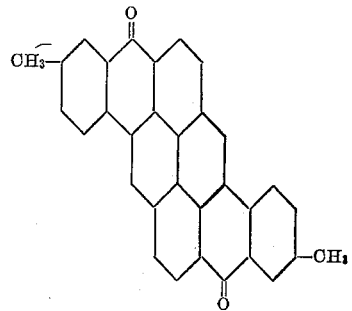

crystallizing from quinoline in the form of orange-yellow needles and yielding from a bluish-red vat clear orange tints of good fastness properties.

GEORG KRÄNZLEIN.
HEINRICH VOLLMANN.
WERNER SCHULTHEIS.